Sheet 2, 2 Sheets.
Stevens, Crosby & Pearson.
Seed Planter.
Nº 12,924.    Patented May 22, 1855.
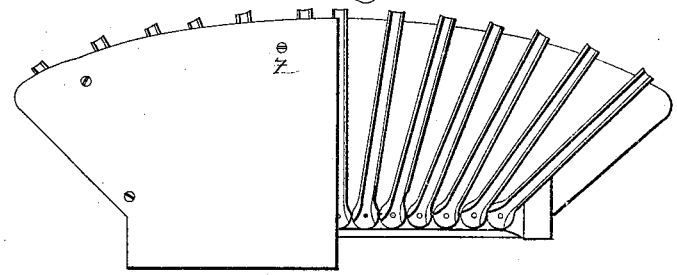
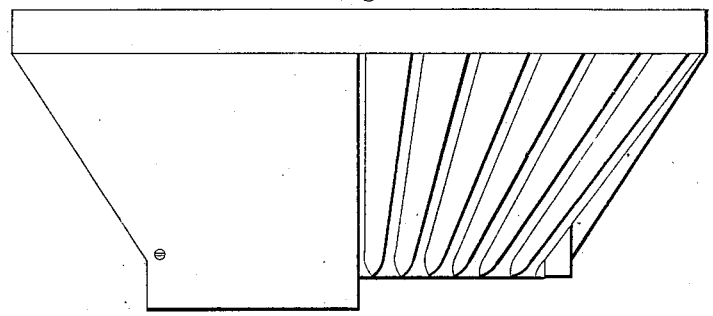
Witnesses
M. H. Merriam
Jeremiah B. Callaghan
Inventors:
E. M. Stevens
J. B. Crosby
J. W. Pearson

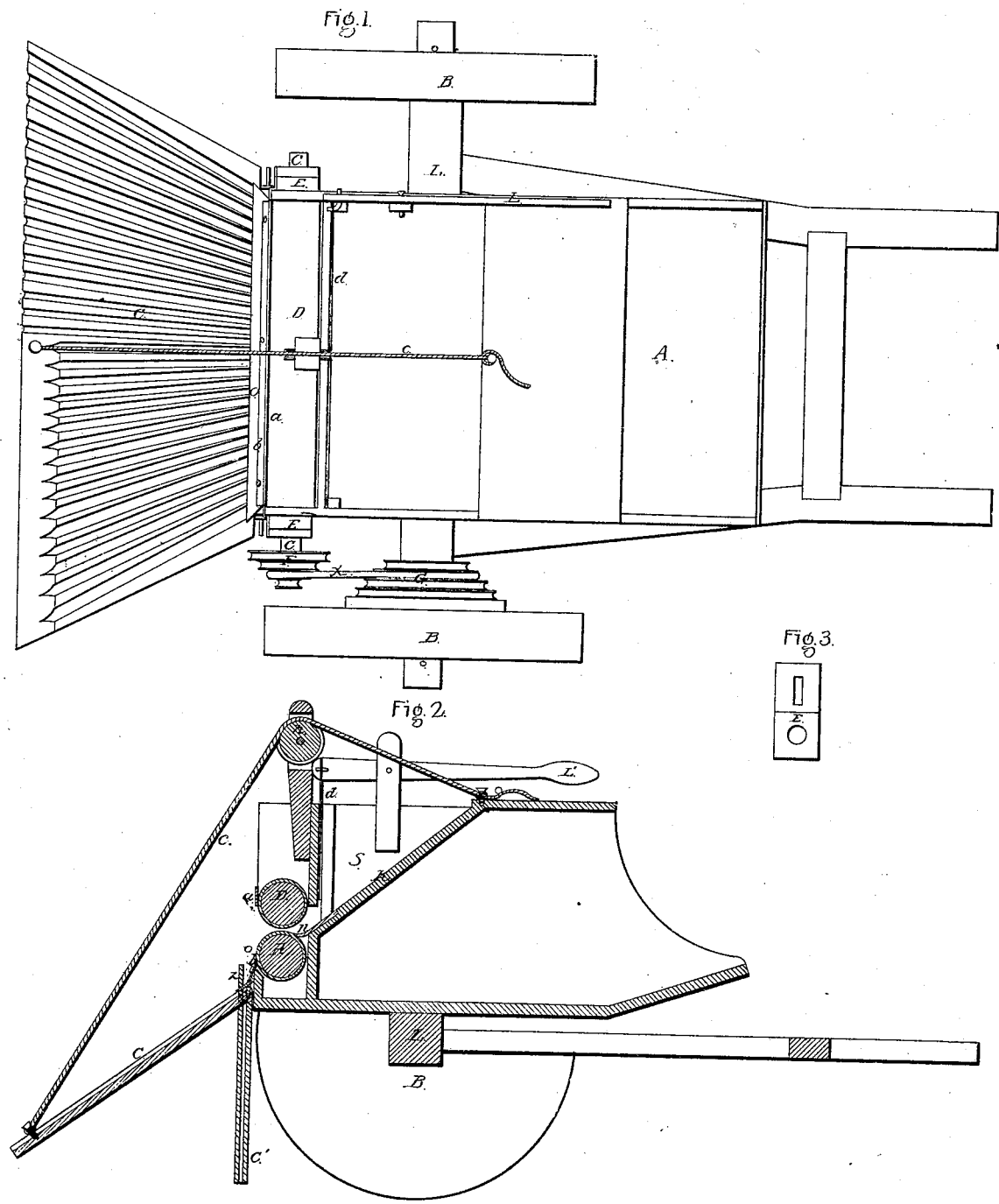

UNITED STATES PATENT OFFICE.

E. M. STEVENS AND JOSEPH B. CROSBY, OF BOSTON, AND JOS. W. PEARSON, OF WINCHESTER, MASSACHUSETTS.

IMPROVEMENT IN SEED-PLANTERS.

Specification forming part of Letters Patent No. 12,924, dated May 22, 1855.

*To all whom it may concern:*

Be it known that we, EDGAR M. STEVENS and JOSEPH B. CROSBY, both of Boston, county of Suffolk, and State of Massachusetts, and JOSEPH W. PEARSON, of Winchester, county of Middlesex, and State aforesaid, have invented certain new and useful Improvements in Machines for Sowing Seed, of which the following description is a full, clear, and exact specification, reference being had to the accompanying drawings, forming a part thereof.

Figure 1 is a plan, and Fig. 2 is a section exhibiting our invention. Fig. 3 is a detail view of a bearing. Fig. 4 is a front view of our adjustable expanding spreader. Fig. 5 is a side view of the same. Fig. 6 is a front view of a spreader, shown also in blue lines, Fig. 2; and Fig. 7 is a side view of the same. The plate $z$ in Figs. 4 and 6 is partially removed to show construction.

Similar letters refer to similar parts in all the figures of the drawings.

It is a desideratum to supply by cheap machinery the place of skill in agricultural labor. To perform the work of broadcast sowing or drill-planting is the object of our invention, the nature of which consists in the peculiar feed and distributing apparatus employed; also, in the manner of providing against accidents which might be caused by the inequalities of the land.

To enable others skilled in the art to make and use our invention, we will proceed to describe its construction and operation.

The body or box A, mounted on an axle, L, supported by the wheels B and B, is divided by the partition K, so as to form a triangular-shaped receptacle for the loose seed or grain to be planted. An opening or outlet for the seed is cut at the lowest point of the seed-box, which may be closed at pleasure by the slide $d$, operated by the lever L'. Two rollers, D and H, are placed outside of the seed-box in such position that their line of contact shall be opposite the opening cut in the back of the seed-box. These rollers are covered with india-rubber, felt, or any suitable yielding material, the object of which is to prevent the seed from being bruised or injured by crushing between the rollers as it is fed out of the seed-box by them.

The machine may be adapted to different-sized seed or grain by adjusting the position of the upper roller, the bearings of which are slotted, as shown in Fig. 3, for that purpose.

The cam-pulley F, fixed on the upper roller-shaft, O, is driven by the belt X from the cone-pulley G, fixed on one of the wheels B. By changing the belt on the cones F and G the speed of the rollers is varied.

It is evident that the amount of grain delivered by the rollers will depend upon their speed, and also that the grains will be in close proximity with each other in the direction of the length of the rollers. This is generally too close for seed to be sown, and in order to spread the seed upon the ground we introduce the distributer or spreader C. This may be made in various ways. The one represented in the drawings is a wide board hinged at one end to the cart-body immediately under the rollers, the other end being supported at a small distance from the ground by the cord $c$, passing over the pulley $h$ and fastened near the seat of the driver. This board is cut into channels from top to bottom, which diverge from each other outward each way from the center to the outside, which is shown in this case to spread to the distance between the wheels. The grain falls from the rollers upon the spreader, and is conducted in and by the grooves to the ground. The spreader (shown in blue lines, Fig. 2, and in Figs. 5 and 6) hangs vertically upon the cart-body, the grooves being covered by the piece $z$, converting them into tubes. This piece $z$ is continued upward beyond the spreader to guide the seed into the tubes or grooves.

A spreader which is capable of being adjusted in width at the bottom or in amount of spread is shown in Figs. 4, 5, and 6, and can be constructed by making the hinged board C plain instead of grooved and placing tubes or spouts thereon hinged at the ends nearest the rollers, but left free to move at their other ends, which can be secured in position by suitable fastenings. The pieces $a$ and $b$ act as scrapers and prevent any seed being carried beyond them by embedment in the rollers.

The piece $n$ serves to guide the grain to the bite of the rollers, and $o$ protects the joint between the spreader and cart-body from getting filled with grain.

A very effective machine may be made for planting seed or grain in drills by attaching to the cart-body small plow-irons preceding the spreader and placed directly in line with each groove or tube thereof, followed by covers and rollers arranged to cover and roll each furrow. This arrangement of the plow-irons, covers, and rollers is in common use, and forms no part of our invention.

The operation of our machine is as follows: The slide $d$ being shut, the hopper S is filled with grain, while the car-body is loaded with as much more as may be desired. The rollers D and H are adjusted to a distance apart suited to the size of the grain, and the belt $x$ arranged to feed fast or slow, as desired. When the operator wishes to sow the ground over which the cart is being drawn he raises the slide $d$, the grain falls into the bite of the yielding, surfaced rollers, and is fed at a regular and proportionate rate to the distance passed over onto the spreader, by which it is conducted to the ground. The spreader, being hinged, will yield and pass over any irregularities of the ground. When it is not desirable to sow in lines or drills, the grooves may be cut short of the end of the spreader, or, what is the same thing, a flat surface may be added to lengthen its lower edge, as shown in blue lines, Fig. 6, which will allow the grain to separate from the grooves and scatter before falling off the spreader. We prefer the employment of two elastic-surfaced rollers, working together as described, although one may be dispensed with if it is deemed desirable.

Our machine is cheaply constructed, not liable to derangement, and by it the labor of boys and animals may be substituted in place of skillful hand-sowers.

Having thus described our machine for sowing grain, what we claim as our invention, and desire to secure by Letters Patent, is—

The application of elastic-surfaced feed-rollers in sowing-machines in connection with an expanding tubed spreader, constructed and arranged substantially in the manner and for the purpose set forth.

E. M. STEVENS.
J. B. CROSBY.
JOSEPH W. PEARSON.

Witnesses:
JEREMIAH RO. CALLAGHAN,
EBEN HOYT.